United States Patent
Shaikh et al.

(10) Patent No.: US 11,879,500 B2
(45) Date of Patent: Jan. 23, 2024

(54) CLAMPING CONFIGURATION FOR WHEEL BEARING ASSEMBLY

(71) Applicant: SCHAEFFLER TECHNOLOGIES AG & CO. KG, Herzogenaurach (DE)

(72) Inventors: Shakeel Shaikh, Windsor (CA); Zheng Wang, Rochester Hills, MI (US); Rajmohan Kolli, Sterling Heights, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/724,911

(22) Filed: Apr. 20, 2022

(65) Prior Publication Data

US 2023/0160427 A1  May 25, 2023

Related U.S. Application Data

(60) Provisional application No. 63/282,418, filed on Nov. 23, 2021.

(51) Int. Cl.
*F16C 19/18* (2006.01)
*F16C 33/58* (2006.01)
*F16C 35/063* (2006.01)

(52) U.S. Cl.
CPC .......... *F16C 33/583* (2013.01); *F16C 19/183* (2013.01); *F16C 19/186* (2013.01); *F16C 35/063* (2013.01); *F16C 2226/60* (2013.01); *F16C 2226/80* (2013.01); *F16C 2326/02* (2013.01)

(58) Field of Classification Search
CPC .... F16C 19/183; F16C 19/186; F16C 33/583; F16C 33/586; F16C 35/063; F16C 43/04; F16C 2226/60; F16C 2226/80; F16C 2326/02; B60B 27/0005; B60B 27/0026; B60B 27/0042; F16B 39/12; F16B 39/24; F16B 39/34
See application file for complete search history.

(56) References Cited

U.S. PATENT DOCUMENTS 3,167,357 A * 1/1965 Savin ................. B60B 27/0005
                                                                301/1
3,586,357 A * 6/1971 Orain ..................... F16D 1/076
                                                              403/380
(Continued)

FOREIGN PATENT DOCUMENTS

DE   112008002714 T5 * 10/2010 ......... B60B 27/0005
DE   102015211455 B4 * 11/2022 ............. B60B 27/00

*Primary Examiner* — Phillip A Johnson
(74) *Attorney, Agent, or Firm* — Volpe Koenig

(57) ABSTRACT

A wheel bearing assembly is disclosed herein. The assembly includes a joint element having a first spline portion defined on an axial surface and a nose. An inner ring is provided that includes a through hole configured to receive at least a portion of the joint element and an abutment flange defined within the through hole. The inner ring includes a second spline portion configured to matingly engage with the first spline, and the nose of the joint element is configured to extend axially within the abutment flange. A connection assembly is configured to connect the inner ring and the joint element, and a portion of the connection assembly abuts a first axial end of the abutment flange.

16 Claims, 2 Drawing Sheets

(56) References Cited

U.S. PATENT DOCUMENTS

| | | | |
|---|---|---|---|
| 7,670,059 B2* | 3/2010 | Gradu | B60B 27/001 464/178 |
| 2009/0252551 A1* | 10/2009 | Kamikawa | B60B 27/0005 403/359.5 |
| 2016/0016431 A1* | 1/2016 | Norimatsu | F16C 35/0635 384/544 |
| 2018/0201060 A1* | 7/2018 | Gibson | F16C 35/063 |

* cited by examiner

CLAMPING CONFIGURATION FOR WHEEL BEARING ASSEMBLY

INCORPORATION BY REFERENCE

This application claims priority to U.S. Provisional Application No. 63/282,418, which was filed on Nov. 23, 2021, and is incorporated herein by reference in its entirety.

FIELD OF INVENTION

The present disclosure generally relates to vehicular wheel bearings, and more specifically is related to a wheel bearing face spline and constant velocity joint (CVJ) interface.

BACKGROUND

Rolling bearings are widely used in various mechanical applications, including the automotive field. Some types of bearings include a tandem rolling bearing, which includes a double row bearing and has two rows of rolling elements, a two-row bearing assembly, three-row bearing assembly, ball bearing assembly, tapered bearing assembly, etc. In a two-row bearing assembly, the two rows are generally arranged in a stepped-manner, and can be axially offset in relation to one another.

Face spline wheel bearing assemblies are well known and generally include an interface between an inner ring of a bearing assembly and an end face of a CVJ. One known configuration for connecting these components includes using a bolt to keep the two components engaged. It is critical to provide a clamping or securing configuration to ensure that the spline teeth on axial end faces of the inner ring and the CVJ remain engaged. However, using a bolt presents problems in higher torque applications because the bolt can deform.

It would be desirable to provide a joining assembly or interface that provides a reliable and durable connection between a bearing assembly and a CVJ.

SUMMARY

A wheel bearing assembly is disclosed herein. The assembly includes a joint element having a first spline portion defined on an axial surface and a nose. An inner ring is provided that includes a through hole configured to receive at least a portion of the joint element and an abutment flange defined within the through hole. The inner ring includes a second spline portion configured to matingly engage with the first spline, and the nose of the joint element is configured to extend axially within the abutment flange. A connection assembly is configured to connect the inner ring and the joint element, and a portion of the connection assembly abuts a first axial end of the abutment flange.

The nose of the joint element can include a first threaded portion.

The connection assembly can include a lock nut having a second threaded portion configured to matingly engage with the first threaded portion on the nose.

The first threaded portion can be formed on a radially outer surface of the nose of the joint element.

The connection assembly can further include a lock washer. The lock washer can include external tabs configured to be bent to engage within corresponding grooves on the lock nut. The lock washer can include internal tabs configured to engage within corresponding grooves formed on the first threaded portion of the joint element.

The wheel bearing assembly can further include a double row bearing, and the abutment flange can be configured to overlap with a portion of the double row bearing in a radial direction. One of ordinary skill in the art would appreciate that the disclosed configuration can be adapted for use in a three-row bearing assembly, or any ball bearing or tapered bearing arrangement.

The abutment flange can be formed on a radially innermost portion of the inner ring.

The joint element can be a constant velocity joint, in one aspect.

A method of assembling a wheel bearing assembly is also disclosed herein. The method can include providing: an inner ring including a first spline portion and a through hole with a radially inner surface defining an abutment flange extending radially inwardly therefrom, and a joint element including a nose having a first threaded portion, and a second spline portion. The method can include engaging the first and second spline portions with each other, and inserting the nose within the through hole defined by the inner ring until the two spline portions are fully engaged. The method can include inserting a lock nut within the through hole of the inner ring and fastening the lock nut onto the first threaded portion of the nose of the joint element. The method can include applying torque to at least one of the joint element or the lock nut until the lock nut engages against an axial surface of the abutment flange.

Additional aspects of the disclosure are described herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly. "Circumferentially" refers to a direction extending along a curve or circumference of a respective element relative to the axis (X) of the assembly. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
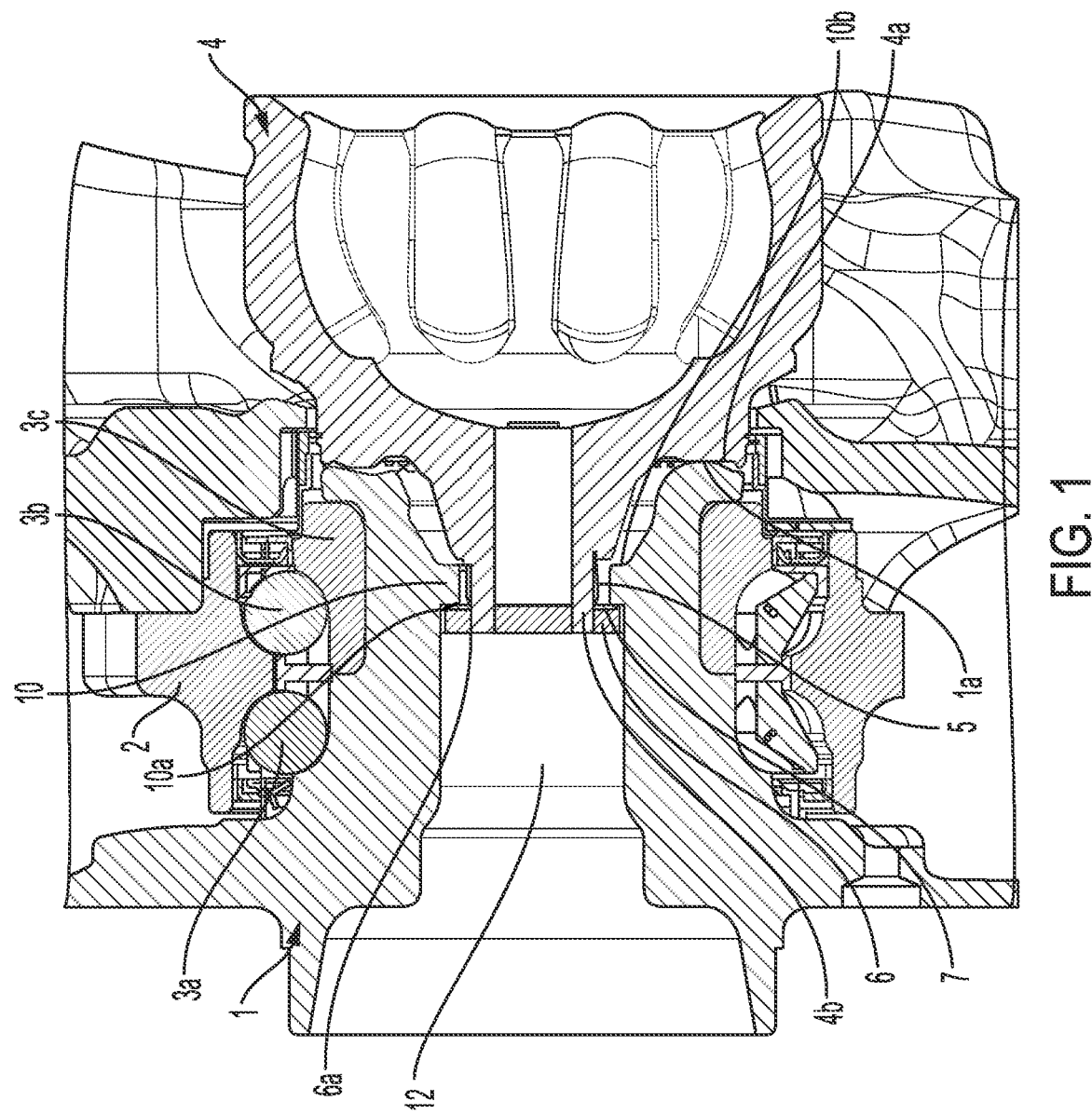
FIG. 1 is a cross-section of a wheel bearing assembly.
Figure 2:
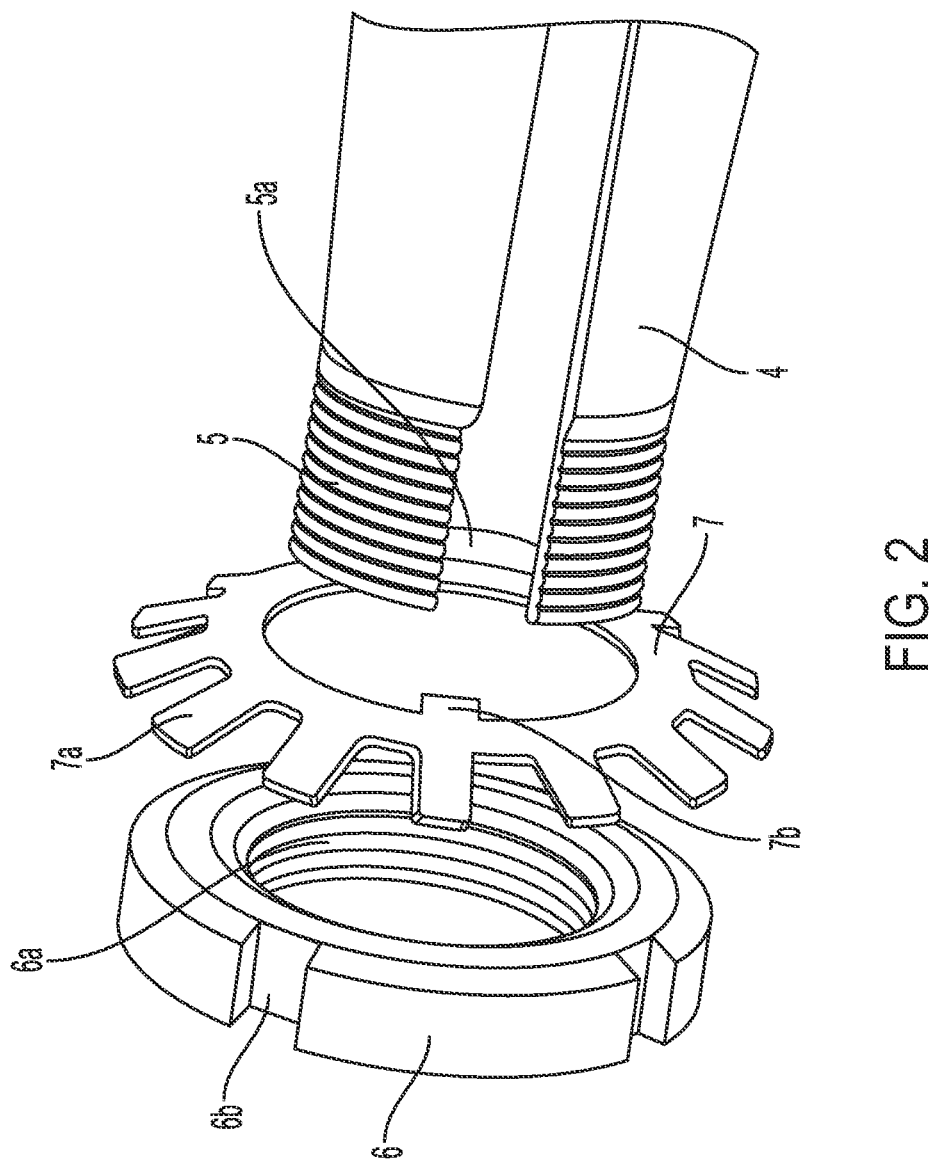
FIG. 2 is an exploded assembly view of a portion of FIG. 1, including a lock nut and lock washer.

As shown in FIG. 1, a wheel bearing assembly is disclosed herein. The wheel bearing assembly generally includes an inner ring 1, an outer ring 2, and a plurality of rolling elements 3a, 3b. In one aspect, a secondary inner ring 3c can be provided, and the rolling elements 3a, 3b are supported between the inner rings 1, 3c and the outer ring 2. A split inner ring or two inner rings can be provided in order to aid with assembly of the wheel bearing assembly.

The outer ring 2 can be non-rotationally fixed to the vehicle structure. "Non-rotationally fixed," in this context means that the outer ring 2 does not rotate about a central axis. It may translate as part of a vehicle suspension system and rotate through a limited range about a vertical axis as part of a vehicle steering system. In alternative embodiments, the inner ring 1 may be non-rotationally fixed to the vehicle structure and the outer ring 2 may rotate about a central axis.

In one aspect, the inner ring 1 includes a through hole 12, dimensioned to receive at least a portion of a joint element 4, which can be a constant velocity joint (CVJ). As shown in FIG. 1, one axial end of the joint element 4 can be configured to be completely enclosed within the inner ring 1. The joint element 4 is axially inserted or pushed relative to the inner ring 1 until engagement occurs between splines 1a on the inner ring 1 and splines 4a on the joint element 4.

The joint element 4 can include a threading on one axial end or nose 4b. For example, the joint element 4 can include a first threaded portion 5 on the axial end or nose 4b. The first threaded portion 5 can be formed on a radially outer surface of the nose 4b of the joint element 4. One of ordinary skill in the art would understand that the first threaded portion 5 can be formed on other surfaces of the joint element 4.

Within the through hole 12 of the inner ring 1, an abutment flange 10 can be provided. A first axial end 10a of the abutment flange 10 can be configured to abut the connection assembly and a second axial end 10b of the abutment flange 10 can be configured to be adjacent to a portion of the joint element 4. In one aspect, the second axial end 10b of the abutment flange 10 can be spaced away from the joint element 4. The abutment flange 10 can have a different shape or profile than illustrated in FIG. 1.

In one aspect, the abutment flange 10 overlaps with a portion of the one of the sets of rolling elements 3a, 3b. The abutment flange 10 can be formed on a radially inner surface of the inner ring 1, in one aspect. In one aspect, a radial plane can intersect both the abutment flange 10 and the secondary inner ring 3c. By arranging the abutment flange 10 on an end of the inner ring 1 adjacent to the splines 1a, the overall axial footprint or envelope of the assembly can be reduced. Based on this configuration, the size and thickness of the inner ring 1 can be reduced.

A connection assembly is also provided that is configured to connect the inner ring 1 and the joint element 4. The connection assembly generally is provided to ensure that the spline portions 1a, 4a on the respective axial ends of the inner ring 1 and the joint element 4 remain engaged with each other. The connection assembly can include multiple components or elements, such as a lock washer 7 and a lock nut 6. In one aspect, the lock nut 6 includes a second threaded portion 6a that is configured to matingly engage with the first threaded portion 5 formed on the joint element 4. In one aspect, the first axial end 10a of the abutment flange 10 can be configured to abut the lock nut 6. In one aspect, the first axial end 10a directly engages an axial face of the lock nut 6.

The lock washer 7 can be arranged around the first threaded portion 5 and can include internal tabs 7b configured to engage within corresponding grooves 5a formed on the first threaded portion 5. The lock washer 7 can also include external tabs 7a that are configured to be bent after the lock washer 7 is arranged in place relative to the first threaded portion 5 and the lock nut 6. The lock nut 6 can include grooves 6b configured to receive the external tabs 7a formed on the lock washer 7. One of ordinary skill in the art would understand that various types of engagement features can be provided between the lock washer 7 and the lock nut 6, as well as the adjacent components.

Based on the configuration disclosed herein, a clamping configuration is provided via the connection assembly in which the abutment flange 10 is clamped on one side by the connection assembly, i.e. the lock nut 6.

A method of assembling a wheel bearing assembly is also disclosed herein. In one aspect, the method includes providing an inner bearing ring or inner ring 1 including a first spline portion 1a, and providing a joint element 4 including a nose 4b having a first threaded portion 5, and also including a second spline portion 4a configured to mate with the first spline portion 1a.

The method includes engaging the splines 1a, 4a and insertion of the nose 4b within a through hole defined by the inner ring 1. An abutment flange 10 is defined on a radially inner surface of the inner ring 1. The method includes inserting a lock nut 6 within the through hole 12 of the inner ring 1 and fastening the lock nut 6 onto the first threaded portion 5 of the nose 4b of the joint element 4. Prior to insertion of the lock nut 6, the method can include inserting a lock washer 7 inside the through hole 12 of the inner ring 1. Torque is applied until the lock nut 6 engages against an axial surface of the abutment flange 10. Next, the method includes locking the lock nut 6 in place via the lock washer 7. In one aspect, the lock washer 7 includes protrusions, tabs, or flanges that are configured to engage with a portion of the nose 4b as well as a portion of the lock nut 6. This ensures that the lock nut 6 remains in place and will not become loose or otherwise disengage from the threaded portion 5 of the nose 4b of the joint element 4.

The configuration disclosed herein provides multiple advantages as compared to known arrangements. As compared to other known connection means, the configuration avoids the use of elongated bolts or fasteners, which are prone to plastic deformation and failure due to high torque loads. As a result, the joint torque capacity is increased. Additionally, by providing a relatively shorter connection assembly as compared to elongated bolts and fasteners, the overall size and weight of the wheel bearing assembly can also be reduced. The locking system disclosed herein can prevent the joint from loosening and thereby also prevent disengagement of the splines.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS inner ring 1
second spline portion 1a
outer ring 2 rolling elements 3a, 3b
secondary inner ring 3c
joint element 4
first spline portion 4a
nose 4b
a first threaded portion 5
grooves 5a
lock nut 6
second threaded portion 6a
grooves 6b on the lock nut
lock washer 7
external tabs 7a
internal tabs 7b
abutment flange 10
first axial end 10a of the abutment flange
second axial end 10b of the abutment flange
through hole 12

What is claimed is:

1. A wheel bearing assembly comprising:
a joint element including a first spline portion defined on an axial surface and an integral nose including a first threaded portion;
an inner ring including a through hole configured to receive at least a portion of the joint element and an abutment flange defined within the through hole, the inner ring including a second spline portion configured to matingly engage with the first spline portion, and the nose of the joint element extends axially within the abutment flange; and
a connection assembly configured to connect the inner ring and the joint element, wherein a portion of the connection assembly abuts a first axial end of the abutment flange.

2. The wheel bearing assembly according to claim 1, wherein the connection assembly includes a lock nut having a second threaded portion configured to matingly engage with the first threaded portion.

3. The wheel bearing assembly according to claim 2, wherein the nose is hollow and the first threaded portion is formed on a radially outer surface of the nose of the joint element.

4. The wheel bearing assembly according to claim 2, wherein the connection assembly further includes a lock washer.

5. The wheel bearing assembly according to claim 4, wherein the lock washer includes external tabs configured to be bent to engage within corresponding grooves on the lock nut.

6. The wheel bearing assembly according to claim 4, wherein the lock washer includes internal tabs configured to engage within corresponding grooves formed on the first threaded portion of the joint element.

7. The wheel bearing assembly according to claim 1, wherein the wheel bearing assembly further comprises a double row bearing, and the abutment flange overlaps with a portion of the double row bearing in a radial direction.

8. The wheel bearing assembly according to claim 1, wherein the abutment flange forms a radially innermost portion of the inner ring.

9. The wheel bearing assembly according to claim 1, wherein the joint element is a constant velocity joint.

10. The wheel bearing assembly according to claim 1, wherein a second axial end of the abutment flange is adjacent to a portion of the joint element.

11. A wheel bearing assembly comprising:
a joint element including a first spline portion defined on an axial surface and a nose having a first threaded portion;
an inner ring including a through hole configured to receive at least a portion of the joint element and an abutment flange defined within the through hole, the inner ring including a second spline portion configured to matingly engage with the first spline portion, and the nose of the joint element extends axially within the abutment flange; and
a connection assembly configured to connect the inner ring and the joint element, the connection assembly includes a lock nut having a second threaded portion configured to matingly engage with the first threaded portion, and the lock nut abuts a first axial end of the abutment flange;
wherein the connection assembly further includes a lock washer; and
wherein the lock washer includes external tabs configured to be bent to engage within corresponding grooves on the lock nut.

12. The wheel bearing assembly according to claim 11, wherein the lock washer includes internal tabs configured to engage within corresponding grooves formed on the first threaded portion of the joint element.

13. A method of assembling a wheel bearing assembly, the method comprising:
(i) providing:
an inner ring including a first spline portion and a through hole defining an abutment flange extending radially inwardly therefrom, and
a joint element including a nose having a first threaded portion, and a second spline portion;
(ii) engaging the first and second spline portions with each other, and inserting the nose within the through hole defined by the inner ring;
(iii) inserting a lock nut within the through hole of the inner ring and fastening the lock nut onto the first threaded portion of the nose of the joint element;
(iv) applying torque to at least one of the joint element or the lock nut until the lock nut engages against an axial surface of the abutment flange; and
(v) inserting a lock washer inside of the through hole prior to step (iii), and then locking the lock nut in place via the lock washer after step (iii);
wherein the lock washer includes a plurality of tabs, and a first set of the plurality of tabs are configured to engage with a portion of the nose and a second set of the plurality of tabs are configured to engage with the lock nut.

14. The method according to claim 13, wherein the abutment flange forms a radially innermost portion of the inner ring.

15. The method according to claim 13, wherein the joint element is a constant velocity joint.

16. The method according to claim 13, wherein the first threaded portion is formed on a radially outer surface of the nose of the joint element.

* * * * *